US011352283B2

(12) United States Patent
Blad

(10) Patent No.: US 11,352,283 B2
(45) Date of Patent: *Jun. 7, 2022

(54) PORTABLE WATER PURIFICATION SYSTEMS AND METHOD OF ASSEMBLING SAME

(71) Applicant: Steven J. Blad, Arrington, TN (US)

(72) Inventor: Steven J. Blad, Arrington, TN (US)

(*) Notice: Subject to any disclaimer, the term of this patent is extended or adjusted under 35 U.S.C. 154(b) by 46 days.

This patent is subject to a terminal disclaimer.

(21) Appl. No.: 16/883,162

(22) Filed: May 26, 2020

(65) Prior Publication Data
US 2020/0283320 A1  Sep. 10, 2020

Related U.S. Application Data

(63) Continuation-in-part of application No. 15/961,560, filed on Apr. 24, 2018, now Pat. No. 10,669,181.
(Continued)

(51) Int. Cl.
B01F 23/232 (2022.01)
B01F 25/312 (2022.01)
(Continued)

(52) U.S. Cl.
CPC ............ C02F 9/005 (2013.01); B01F 23/232 (2022.01); B01F 25/3121 (2022.01);
(Continued)

(58) Field of Classification Search
CPC .. C02F 1/325; C02F 1/78; C02F 9/005; C02F 2201/008; C02F 2201/009
See application file for complete search history.

(56) References Cited

U.S. PATENT DOCUMENTS 4,296,328 A  10/1981 Regan
5,106,495 A   4/1992 Hughes
(Continued)

FOREIGN PATENT DOCUMENTS

WO  2008130710 A1  10/2008
WO  2015063581 A1   5/2015
WO  2016174667 A1  11/2016

OTHER PUBLICATIONS

PCT International Search Report and Written Opinion, dated Jul. 16, 2018, for International application PCT/US2018/034627; 14 pp.
(Continued)

Primary Examiner — Bradley R Spies
(74) Attorney, Agent, or Firm — Armstrong Teasdale LLP

(57) ABSTRACT

A portable liquid filtration device includes a GPS tracking unit, a portable housing, an inlet configured to receive non-potable water, and an ozone chamber positioned within the portable housing. The ozone chamber is configured to generate an ozone gas from received air. The device also includes a filtration duct positioned within the portable housing and downstream from the inlet. The filtration duct includes at least one oxidation chamber configured to mix the received water with the ozone gas, and at least one ultraviolet (UV) chamber downstream from the at least one oxidation chamber and including a UV lamp positioned adjacent the water within the filtration duct. The device further includes an outlet positioned on the portable housing and downstream from the filtration duct. The filtration duct is operable to output at least 150 liters per hour of the received water from the outlet as potable water.

20 Claims, 11 Drawing Sheets

Related U.S. Application Data which is a continuation-in-part of application No. 15/688,056, filed on Aug. 28, 2017, now Pat. No. 10,858,266.

(51) Int. Cl.
    *C02F 1/32*       (2006.01)
    *C02F 1/78*       (2006.01)
    *C02F 9/00*       (2006.01)
    *B01F 101/00*    (2022.01)
    *C02F 1/00*       (2006.01)

(52) U.S. Cl.
    CPC ......... *B01F 2101/305* (2022.01); *C02F 1/001* (2013.01); *C02F 1/325* (2013.01); *C02F 1/78* (2013.01); *C02F 2201/008* (2013.01); *C02F 2201/009* (2013.01); *C02F 2201/782* (2013.01); *C02F 2201/784* (2013.01); *C02F 2301/08* (2013.01); *C02F 2303/04* (2013.01)

(56) References Cited

U.S. PATENT DOCUMENTS

| | | |
|---|---|---|
| 5,393,419 A | 2/1995 | Tiede et al. |
| 5,427,693 A | 6/1995 | Mausgrover et al. |
| 5,433,848 A | 7/1995 | Platter et al. |
| 6,558,537 B1 | 5/2003 | Herrington et al. |
| 6,716,343 B2 | 4/2004 | Kool et al. |
| 6,814,876 B1 | 11/2004 | Neal |
| 7,033,506 B2 | 4/2006 | Lejeune |
| 7,135,106 B2 | 11/2006 | Marquis et al. |
| 8,728,310 B1 | 5/2014 | Tjutjunnik |
| 8,808,537 B1 | 8/2014 | Livingston |
| 9,073,762 B2 | 7/2015 | Cummins |
| 2001/0040122 A1 | 11/2001 | Barnes |
| 2004/0168989 A1 | 9/2004 | Tempest et al. |
| 2007/0129265 A1 | 6/2007 | Ito et al. |
| 2007/0248488 A1 | 10/2007 | Denkewicz |
| 2009/0041617 A1 | 2/2009 | Lee |
| 2009/0071331 A1 | 3/2009 | Gillette |
| 2009/0084734 A1 | 4/2009 | Yencho |
| 2009/0178968 A1 | 7/2009 | Cummins |
| 2010/0025337 A1 | 2/2010 | Yencho |
| 2010/0135869 A1 | 6/2010 | Shiue et al. |
| 2012/0085691 A1 | 4/2012 | Cummins |
| 2012/0186658 A1 | 7/2012 | Kuennen et al. |
| 2013/0004382 A1 | 1/2013 | Chen |
| 2014/0094975 A1 | 4/2014 | Nielsen |
| 2014/0158640 A1 | 6/2014 | Elliott et al. |
| 2014/0202542 A1 | 7/2014 | Larocque et al. |
| 2014/0353256 A1 | 12/2014 | Kaschek et al. |
| 2016/0311698 A1 | 10/2016 | Lee |
| 2017/0137304 A1 | 5/2017 | Adams et al. |
| 2018/0141838 A1 | 5/2018 | Ben-Shalom et al. |

OTHER PUBLICATIONS

Szabo, J., "Disinfection of biological agents in the field using a mobile advanced oxidation process," Sep. 2016, EPA/600/R-16/112, USEPA Office of Research and Development, Cincinnati, Ohio USA; 30 pp.

PORTABLE WATER PURIFICATION SYSTEMS AND METHOD OF ASSEMBLING SAME

CROSS-REFERENCE TO RELATED APPLICATIONS

This application is a continuation-in-part application of U.S. application Ser. No. 15/961,560, filed Apr. 24, 2018, which is a continuation-in-part application and claims the benefit of U.S. application Ser. No. 15/688,056, filed Aug. 28, 2017, which are both incorporated herein by reference in their entirety.

BACKGROUND

The field of the disclosure relates generally to liquid purification systems, and more particularly to a portable, self-contained water purification device.

In at least some areas of the world, the availability of potable water supplies is minimal or nonexistent. The need for potable water in a particular area may arise from a lack of naturally present potable water, some variety of accidental contamination, or from a natural disaster such as an earthquake or a flood that results in contamination of the water supply. Natural disasters may also result in damage to a disaster area's water supply infrastructure. In natural disaster scenarios, for example, a water purification system may be delivered to the area of need to augment its potable water producing capabilities. However, at least some water purification systems have a weight or bulk that prevents or inhibits transportation to areas of need, and/or power requirements that prevent or inhibit use at areas of need.

At least some known water purification systems include at least one filter and a pump to move water through the filter. Some known water purification systems include multiple filtration steps including introducing ozone to the water and exposing the water to ultraviolet light. However, at least some of these systems are not designed to remove both chemical and biological contaminants such as pesticides and infectious disease carriers.

BRIEF DESCRIPTION

In one aspect, a portable liquid filtration device is provided. The portable liquid filtration device includes includes a portable housing having a first dimension, a second dimension, and a third dimension, the three dimensions orthogonal to each other, wherein the first dimension is greater than the second and the third dimensions. An inlet is positioned on the portable housing and is oriented to receive non-potable water therethrough. An ozone chamber is defined within the portable housing, the ozone chamber oriented to receive air from external of the portable housing and to generate an ozone gas from the received air. A filtration duct is within the portable housing and is in downstream flow communication with the inlet. The filtration duct includes at least one oxidation chamber configured to mix the received water with the ozone gas from the ozone chamber, wherein the at least one oxidation chamber includes a first outlet and a second outlet, the first outlet oriented to discharge a primary stream having a first density therethrough, and the second outlet oriented to discharge a waste stream having a second density therethrough, wherein the second density is greater than the first density. At least one ultraviolet (UV) chamber is oriented to receive the primary stream from the at least one oxidation chamber, the at least one UV chamber including a UV lamp adjacent to the water within the filtration duct, and the UV lamp configured to irradiate the water with UV light. A liquid waste discharge is on the portable housing and is in downstream fluid communication with the second outlet to discharge the waste stream from the portable housing. An outlet is on the portable housing and is in downstream flow communication with the filtration duct, wherein the filtration duct is operable to output at least 150 liters per hour of the received water from the outlet as potable water.

In another aspect, a method of filtering non-potable water to produce potable water with a portable liquid filtration device is provided. The method includes receiving non-potable water at an inlet on a portable housing having a first dimension, a second dimension, and a third dimension, the three dimensions orthogonal to each other, wherein the first dimension is greater than the second and the third dimensions. The method also includes receiving air from external of the portable housing within an ozone chamber within the portable housing, the ozone chamber configured to generate an ozone gas using the received air, channeling the non-potable water through a filtration duct within the portable housing, the filtration duct in downstream flow communication with the inlet, mixing the received water with ozone gas from the ozone chamber within at least one oxidation chamber, wherein the at least one oxidation chamber includes a first outlet and a second outlet, discharging a primary stream having a first density from the first outlet, discharging a waste stream having a second density from the second outlet, wherein the second density is greater than the first density, channeling the primary stream towards at least one ultraviolet (UV) chamber having a UV lamp adjacent to the water within the filtration duct, the UV lamp configured to irradiate the water with UV light, discharging the waste stream from a liquid waste discharge on the portable housing, the liquid waste discharge in downstream fluid communication with the second outlet, and outputting at least 150 liters per hour of the received water as potable water from an outlet in downstream flow communication with the filtration duct.

DETAILED DESCRIPTION

The embodiments described herein overcome at least some of the disadvantages of known liquid purification systems. The embodiments include a portable liquid filtration device including a portable housing, an inlet, an ozone chamber, a filtration duct including at least one oxidation chamber and at least one ultraviolet (UV) chamber, and an outlet. The at least one oxidation chamber and the at least one UV chamber cooperate to sanitize the received liquid. More specifically, the at least one oxidation chamber mixes the received liquid with ozone gas from the ozone chamber, and the at least one UV chamber irradiates the received liquid with UV light (i.e., performs advanced oxidation). The filtration duct produces potable water at an output of 150 liters per hour or more. In some embodiments, the device weighs no more than 50 pounds and/or occupies no more than four cubic feet, or even no more than two cubic feet.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to an inlet end or inlet area of a component of a portable liquid purification device, and the term "downstream" refers to an outlet end or outlet area of a component of a portable liquid purification device.

Figure 1:
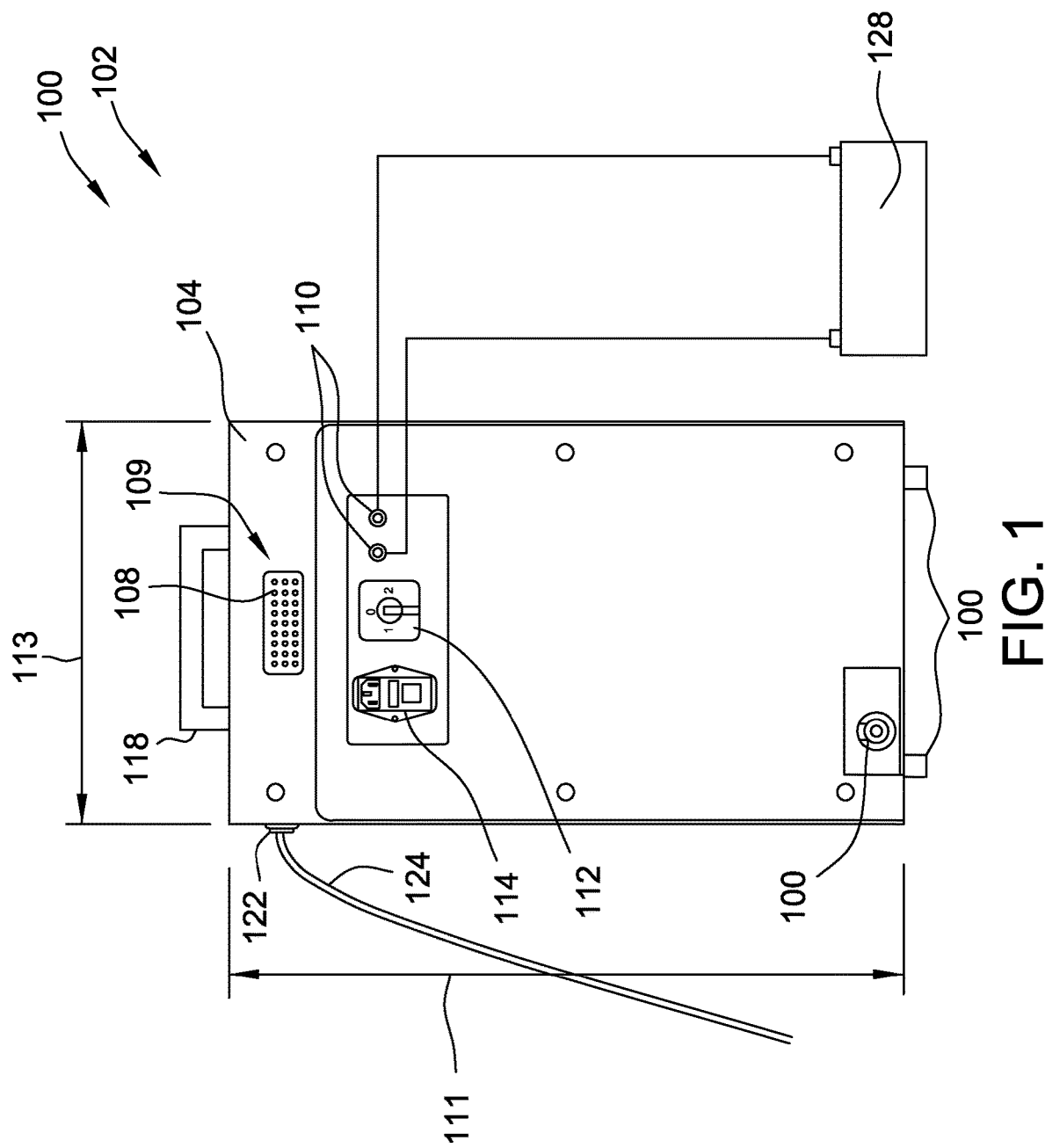
FIG. 1 is a front view of an exemplary portable liquid filtration device.
Figure 2:
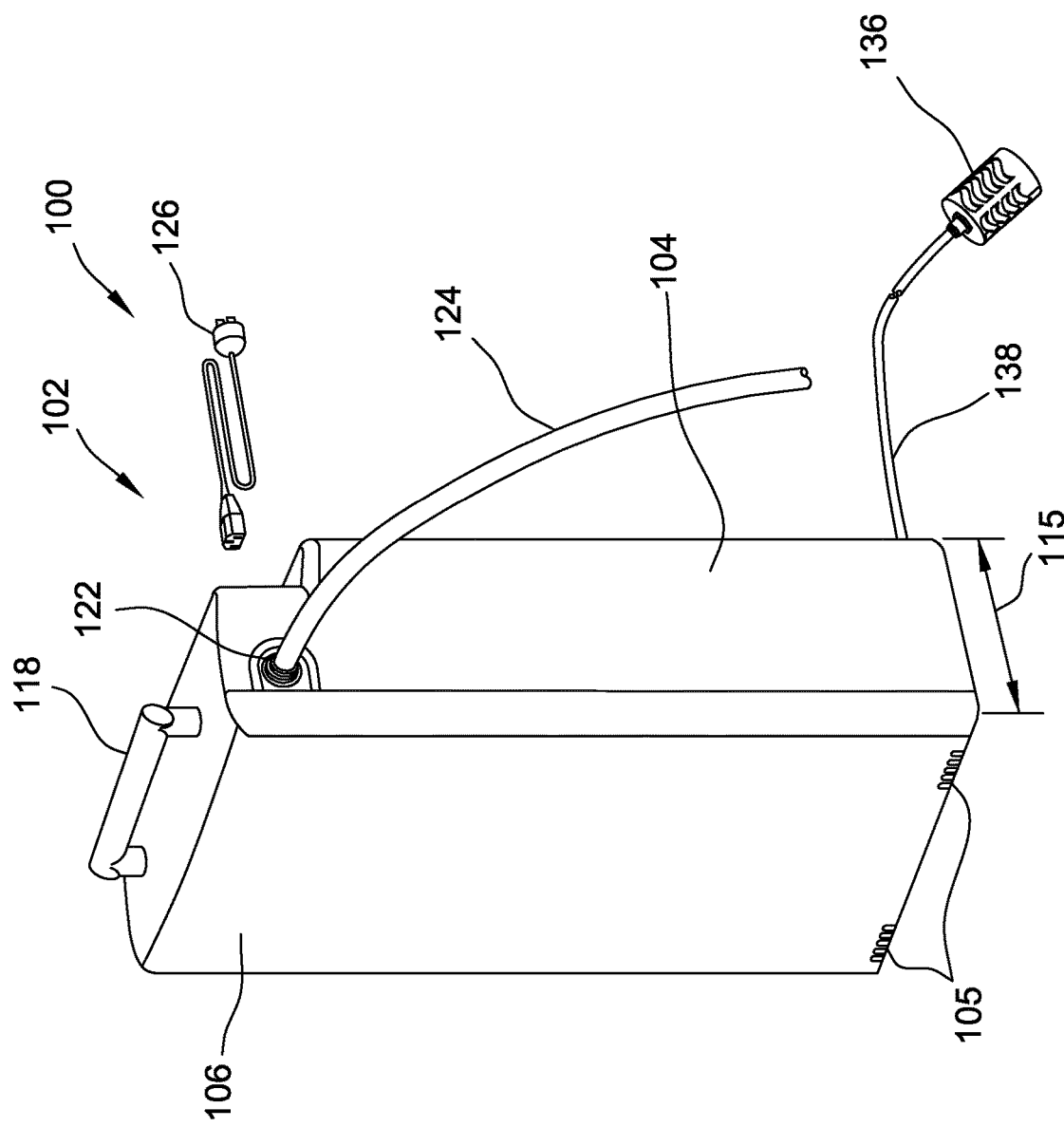
FIG. 2 is a perspective view of the portable liquid filtration device shown in FIG. 1.
Figure 3:
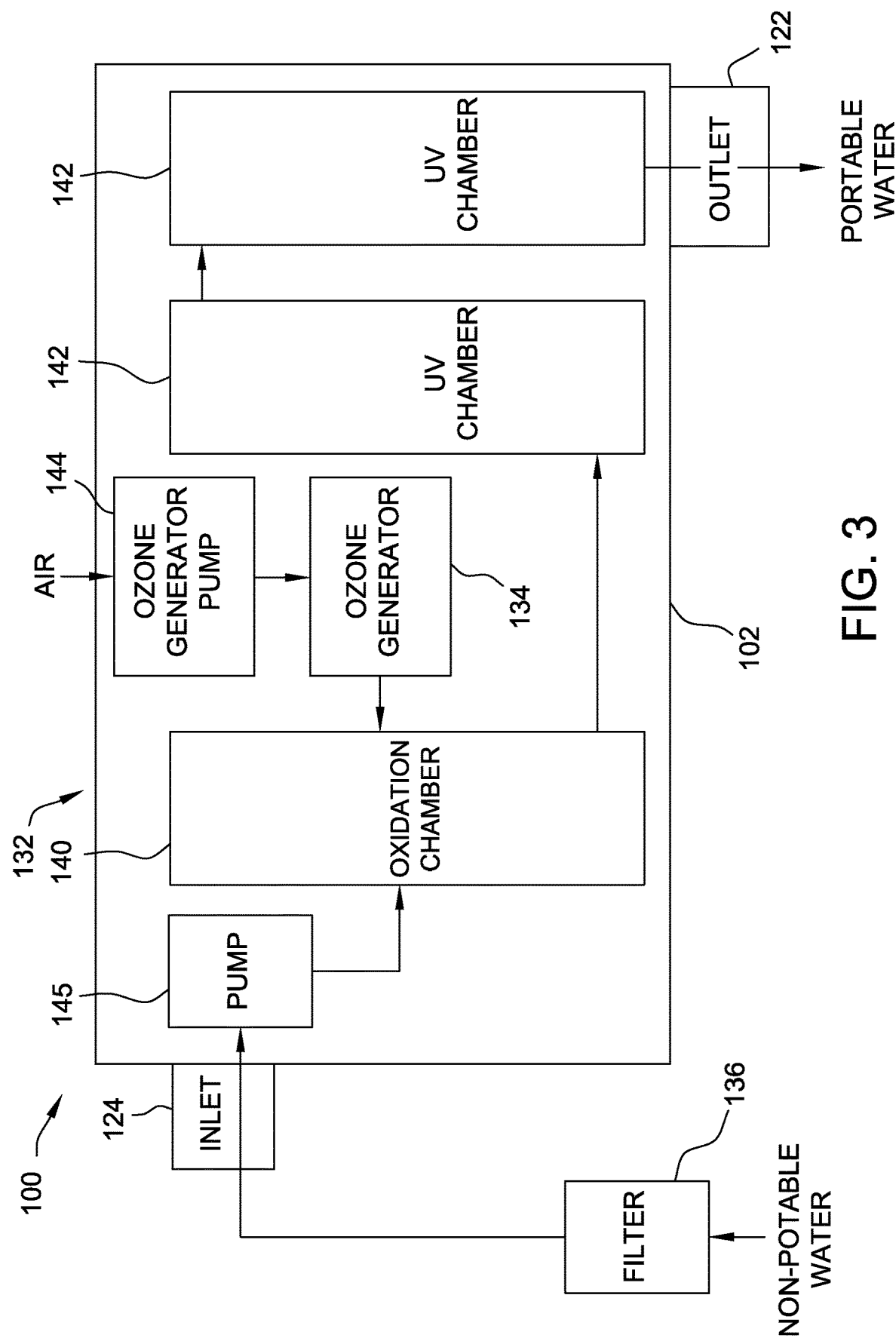
FIG. 3 is a block diagram of the portable liquid filtration device shown in FIG. 1.

FIG. 1 is a front view of an exemplary portable liquid filtration device 100. FIG. 2 is a perspective view of portable liquid filtration device 100 (shown in FIG. 1). FIG. 3 is a block diagram of portable liquid filtration device 100 (shown in FIG. 1). A coordinate system 101 includes an X-axis defining a first, horizontal direction, a Y-axis defining a second, transverse direction, and a Z-axis defining a third, vertical direction, the three axes orthogonal to each other. With reference to FIGS. 1-3, in the exemplary embodiment, portable liquid filtration device 100 includes a portable housing 102 including a front cover 104 and a back cover 106 including a pair of ventilation/drainage openings 105, a vent 108, a pair of direct current (DC) ports 110, an alternating current/DC (AC/DC) switch 112, a male receptacle switch assembly 114, a plurality of wheels 116, a handle 118, and an inlet 120 and outlet 122 positioned on and extending through portable housing 102. Portable housing 102 has a first dimension 111, a second dimension 113, and a third dimension 115, wherein first dimension 111 is greater than second dimension 113 and third dimension 115. In the exemplary embodiment, first dimension 111 extends along the vertical, Z-direction.

In the exemplary embodiment, handle 118 and four wheels 116 are coupled to portable housing 102. More specifically, handle 118 is coupled to a vertically upper portion of back cover 106 and is configured to facilitate grasping, lifting, and transporting portable liquid filtration device 100 by a user. Wheels 116 are coupled to a vertically lower portion of back cover 106 and are configured to facilitate enabling portable liquid filtration device 100 to translate in an substantially XY-plane corresponding to the ground. Vent 108 is coupled to an opening 109 extending through front cover 104 to facilitate an exchange of gas been an interior area of portable housing 102 and an outer environment surrounding portable housing 102. Ventilation/drainage openings 105 extend through a vertically lower portion of back cover 106 and are configured to facilitate additional gas exchange between the interior area of portable housing 102 and the outer environment and to facilitate drainage of any liquid leakage occurring within portable housing 102. In an alternative embodiment, portable housing 102 may include any number and type of handles 118, wheels 116, and vents 108 that facilitate operation of portable liquid filtration device 100 as described herein.

In the exemplary embodiment, a external battery 128 is coupled to DC ports 110 and provides power to portable liquid filtration device 100. In an alternative embodiment, a cord 126 (shown in FIG. 2) may be coupled between an AC power source and male receptacle switch assembly 114 to provide AC power to portable liquid filtration device 100. AC/DC switch 112 facilitates operation of portable liquid filtration device 100 using either AC or DC power, depending on which position AC/DC switch 112 is placed in. In the exemplary embodiment, a position "1" of AC/DC switch 112 enables AC power to be used to operate portable liquid filtration device 100, and a position "2" enables DC power to be used to operate portable liquid filtration device 100. A position "0" of AC/DC switch 112 is an off-position that does not allow power to flow to portable liquid filtration 100 from external battery 128 or power cord 126. In the exemplary embodiment, external battery 128 is a 12 volt, 300 ampere-hour battery. In alternative embodiments, external battery 128 may be any type of battery that facilitates operation of portable liquid filtration device 100 as described herein.

In the exemplary embodiment, inlet 120 is configured to receive non-potable liquid and to channel the non-potable liquid to a filtration assembly 130 housed within portable housing 102. In the exemplary embodiment, the non-potable liquid is non-potable water. In alternative embodiments, inlet 120 is configured to receive non-potable liquids including bodily fluids and water-containing liquids, for example. Filtration assembly 130 includes a filtration duct 132 in downstream fluid communication with inlet 120, an ozone chamber 134 positioned within portable housing 102 and configured to provide ozone to filtration duct 132, an outlet 122 positioned on and extending through portable housing 102 and in downstream flow communication with filtration duct 132, and a middle cover 135 configured to facilitate retaining filtration assembly 130 within portable housing 102. In alternative embodiments, portable liquid filtration device 100 further includes any other component that enables portable liquid filtration device 100 to function as described herein.

In the exemplary embodiment, portable liquid filtration device 100 also includes a sediment filter 136 in upstream flow communication with inlet 120. Sediment filter 136 is configured to remove particulates from the non-potable water channeled through inlet 120. A flexible inlet tube 138 extends between inlet 120 and sediment filter 136. In alternative embodiments, portable liquid filtration device 100 does not include sediment filter 136.

In the exemplary embodiment, filtration duct 132 includes an oxidation chamber 140 and a pair of ultraviolet (UV) chambers 142 coupled together in serial flow communication. An ozone chamber pump 144 is configured to draw air from outside portable housing 102 and channel the air to ozone chamber 134. Ozone chamber 134 is configured to generate an ozone gas from the received air, and channel the ozone gas to introduction into a flow of liquid through oxidation chamber 140. In the exemplary embodiment, ozone chamber 134 generates the ozone gas via a high voltage discharge into the air received from ozone chamber pump 144. In another embodiment, ozone chamber 134 generates the ozone gas via ultraviolet radiation of the air received from ozone chamber pump 144, for example using a dedicated ozone-generating UV lamp that produces radiation at 185 nanometers wavelength. In alternative embodiments, ozone chamber 134 generates the ozone gas in any suitable fashion that enables portable liquid filtration device 100 to function as described herein. In addition, alternatively, air (e.g., ozone gas) may be drawn from outside portable housing 102 with Venturi nozzle 206 (shown in FIG. 5).

Water received through inlet 120 is channeled into oxidation chamber 140, flows through oxidation chamber 140 while mixing with the generated ozone gas, and is channeled into a first of UV chambers 142 that is in downstream flow communication with oxidation chamber 140. After exiting the first of UV chambers 142, the water is channeled into a second of UV chambers 142, flows through the second of UV chambers 142, and is channeled through outlet 122 and a flexible outlet tube 124 as potable water. A water pump 145 is in serial flow communication with filtration duct 132 and inlet 120 to draw in water. In the exemplary embodiment, flow through oxidation chambers 140 and UV chambers 142 is aligned with first dimension 111. In some embodiments, this configuration enables a length of oxidation chambers 140 and/or UV chambers 142 to be a driver of a size of portable housing 102, and facilitates arrangement of other components of portable liquid filtration device 100 to reduce a size of portable housing 102. In alternative embodiments, the components of filtration duct 132 may be arranged in any configuration that enables portable liquid filtration device 100 to function as described herein.

In some embodiments, waste is generated as the water flows through filtration duct 132, and the waste is discharged along with a portion of the received water from at least one liquid waste discharge port 146 (shown in FIG. 7) on portable housing 102. For example, the waste is separated from the primary flow through filtration duct 132 due to a relatively heavier weight and/or a higher momentum of the waste as the flow is channeled through a turn in the flow path through filtration duct 132, and is channeled to liquid waste discharge port 146. In alternative embodiments, waste is not generated in sufficient amounts in filtration duct 132 to merit discharge.

Figure 4:
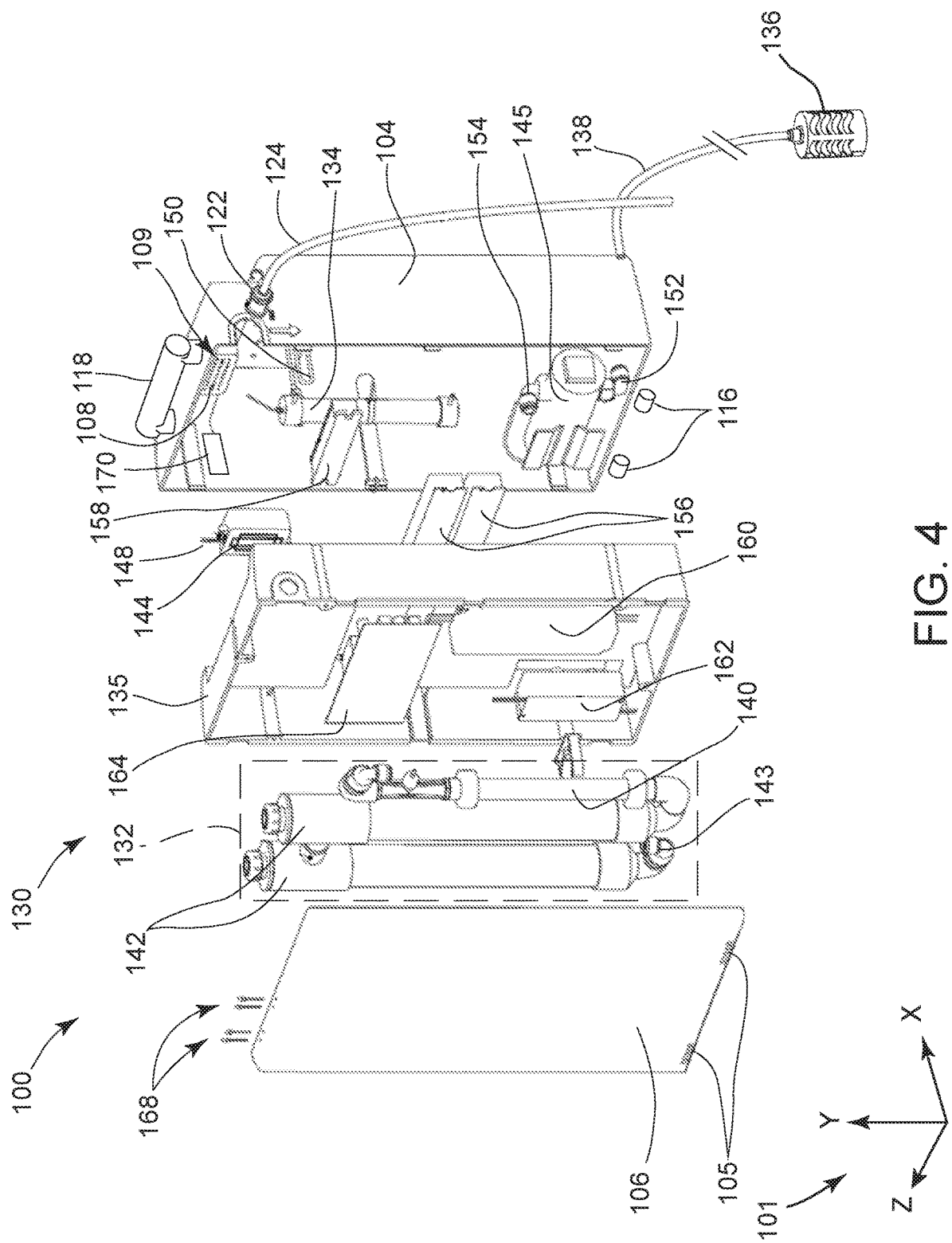
FIG. 4 is an exploded view of the portable liquid filtration device shown in FIG. 1.

FIG. 4 is an exploded view of the portable liquid filtration device 100 (shown in FIG. 1) illustrating an exemplary arrangement of filtration assembly 130 within portable housing 102. In the exemplary embodiment, filtration assembly 130 also includes connecting flow channels between oxidation chamber 140, UV chambers 142, and associated components. In the exemplary embodiment, the received air is channeled through a flexible air delivery tube 148 from ozone chamber pump 144 to ozone chamber 134. Similarly, ozone gas generated by ozone chamber 134 is channeled to oxidation chamber 140 through an ozone delivery tube 150. The received non-potable water is channeled from inlet 120 to water pump 145 through a pump inlet tube 152. The received water is discharged from water pump 145 and is channeled to oxidation chamber 140 through a pump inlet tube 154. After flowing through oxidation chamber 140 and each UV chamber 142, potable water is discharged from the second of UV chambers 142 and is channeled to outlet 122 through a UV chamber discharge tube 143. In alternative embodiments, filtration assembly 130 includes any suitable connecting flow channels that enable portable liquid filtration device 100 to function as described herein.

In the exemplary embodiment, filtration assembly 130 further includes a pair of UV lamp ballasts 156, an electrical distribution block 158, a switching supply transformer 160, an ozone pump transformer 162, an inverter 164, two pairs of indicator lights 168, and a global positioning system (GPS) tracking unit 170. GPS tracking unit 170 is configured to communicate with the global positioning system to facilitate determining a location of portable liquid filtration device 100. Indicator lights 168 are configured to indicate an operational status of a UV lamp 157 (shown in FIG. 6) within each UV chamber 142 during operation of portable liquid filtration device 100, wherein the operational status is at least one of operable, other than optimally operable, and inoperable. Electrical distribution block 158 is configured to receive electrical power from an electrical power source via a power cord 126 and/or DC ports 110. Inverter 164 is configured to receive DC power from DC ports 110, convert the received DC power to AC power, and output the AC power to filtration assembly 130. In alternative embodiments, AC and/or DC power may be received by any means that facilitates operation of portable liquid filtration device 100 as described herein.

In the example embodiment, power cord 126 is configured to interface with a male receptacle switch assembly 114 and with a U.S. National Electrical Manufacturers Association (NEMA) 5-15 receptacle. In alternative embodiments, power cord 126 is configured to interface with any type of receptacle that enables portable liquid filtration device 100 to function as described herein. In other alternative embodiments, portable liquid filtration device 100 includes an internal battery 166 (shown in FIG. 8) and inverter 164 is configured to receive DC power from internal battery 166 and transmit AC power to filtration assembly 130. In yet another alternative embodiment, portable liquid filtration device 100 includes both power cord 126 and internal battery 166, and portable liquid filtration device 100 is selectively switchable between the power sources. In some embodiments, internal battery 166 is rechargeable and/or replaceable.

In the exemplary embodiment, electrical distribution block 158 distributes power from the active power source, for example power cord 126 inverter 164, to the various components of portable liquid filtration device 100. For example, each UV lamp ballast 156 receives electrical power from electrical distribution block 158 and is used to limit the flow of electrical power through each UV lamp 157. For another example, ozone pump transformer 162 receives electrical power from electrical distribution block 158 via switching supply transformer 160 and steps up or down the line voltage of the received AC power to meet the requirements of ozone chamber pump 144 before transmitting the electrical power to ozone chamber pump 144. In alternative embodiments, AC and/or DC power is distributed to the components of portable liquid filtration device 100 in any suitable fashion that enables portable liquid filtration device 100 to function as described herein.

Figure 5:
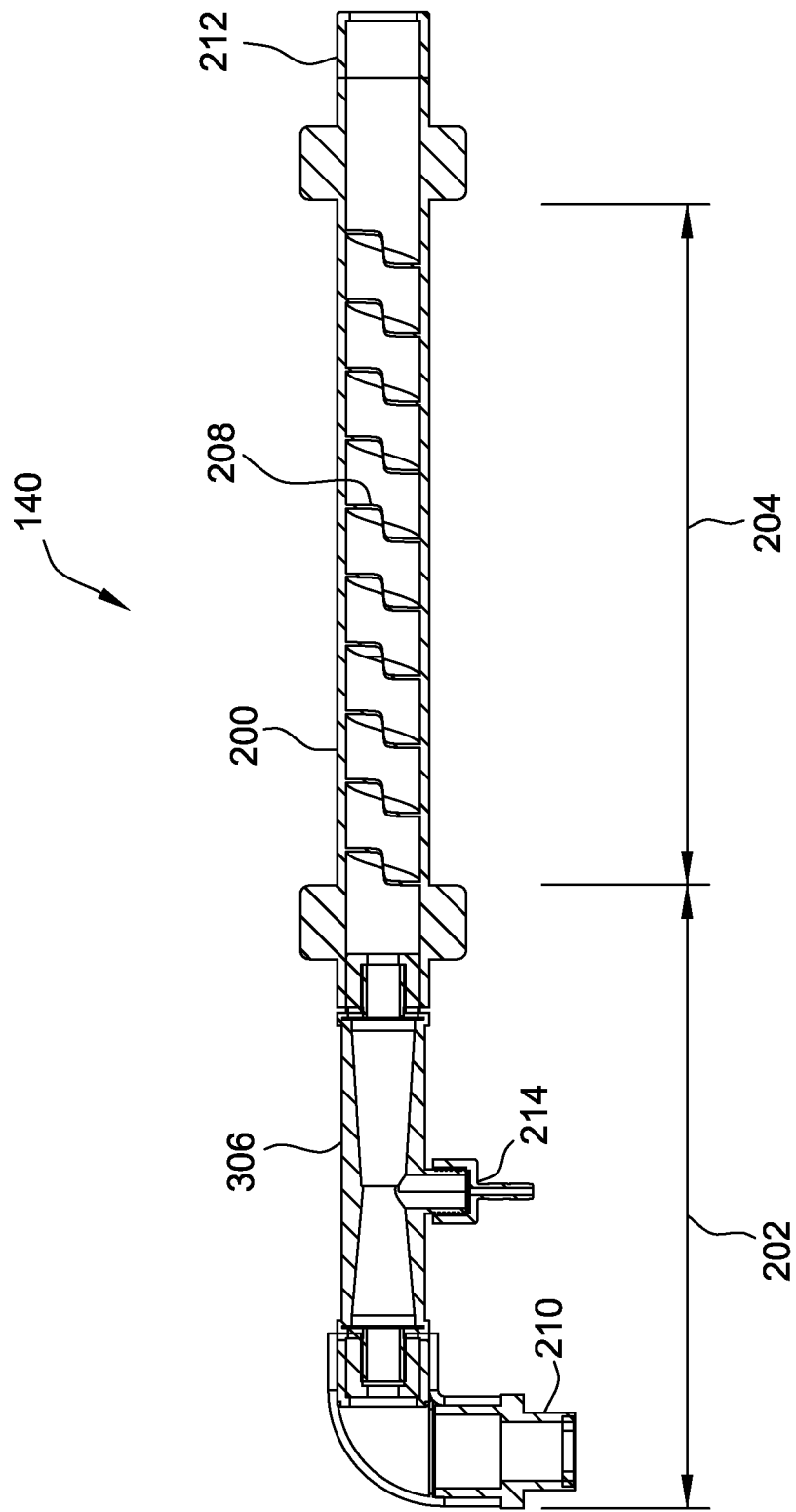
FIG. 5 is a sectional side view of an exemplary oxidation chamber that may be used with the filtration assembly shown in FIG. 3.

FIG. 5 is a sectional side view of exemplary oxidation chamber 140 that may be used with filtration assembly 130 (shown in FIG. 4). As described above, oxidation chamber 140 is configured to mix the non-potable water received from inlet 120 with the ozone gas received from ozone chamber 134. In the exemplary embodiment, oxidation chamber 140 includes a generally tubular oxidation chamber body 200 that includes a first mixing portion 202 and a second mixing portion 204 in downstream flow communication with first mixing portion 202. oxidation chamber 140 is configured to receive water through an oxidation chamber inlet 210, channel the water serially through first mixing portion 202 and second mixing portion 204, and channel the water out of oxidation chamber 140 via an oxidation chamber outlet 212.

In the exemplary embodiment, first mixing portion 202 includes an ozone gas inlet 120 configured to channel the ozone gas from ozone chamber 134 into first mixing portion 202. In the exemplary embodiment, first mixing portion 202 also includes a Venturi nozzle 206 configured to increase a flow speed and/or turbulence of the received water proximate to ozone gas inlet 214, such that interaction between the ozone gas and the received water and the absorption of the ozone gas by the received water is increased. For example, in some embodiments, a mixing efficiency of first mixing portion 202 is at least 25 percent. In an alternative embodiment, ozone gas inlet 120 is configured to divide the ozone gas into a plurality of separate streams of the ozone gas before introducing the ozone gas into first mixing portion 202 to facilitate increasing absorption of the ozone gas by the received water. In other alternative embodiments, oxidation chamber 140 is configured to receive the ozone gas at any suitable location along oxidation chamber 140, and/or first mixing portion 202 does not include Venturi nozzle 206. In yet other alternative embodiments, a plurality of ozone gas inlets 120 are located along oxidation chamber 140 and are configured to introduce the ozone gas into the received water at a plurality of locations to facilitate increasing absorption of the ozone gas by the received water.

In the exemplary embodiment, second mixing portion 204 includes a mixing vane 208 configured to facilitate further mixing of the received water with the ozone gas within oxidation chamber 140. More specifically, in the exemplary embodiment, mixing vane 208 has a helical spiral shape. In alternative embodiments, mixing vane 208 has any suitable shape that enables portable liquid filtration device 100 to function as described herein. In some embodiments, oxidation chamber 140 has a length of less than 20 inches. For example, Venturi nozzle 206 has a length of about 5 inches and mixing vane 208 has a length of about 10 inches. In alternative embodiments, each of oxidation chamber 140, Venturi nozzle 206, and mixing vane 208 has any suitable length that enables portable liquid filtration device 100 to function as described herein. In alternative embodiments, oxidation chamber 140 has any suitable number and type of mixing portions that enables portable liquid filtration device 100 to function as described herein.

Figure 6:
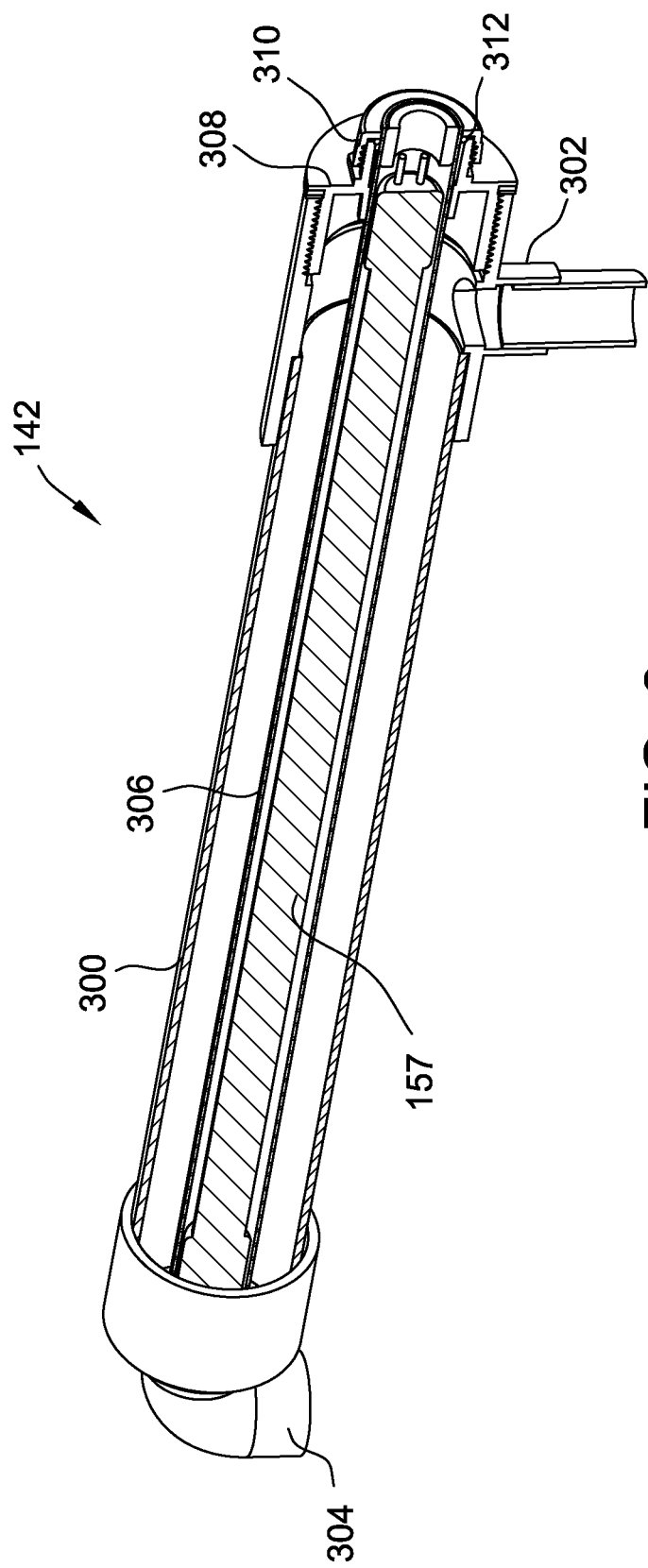
FIG. 6 is a partial sectional side view of an exemplary ultraviolet (UV) chamber that may be used with the filtration assembly shown in FIG. 3.

FIG. 6 is a partial sectional side view of exemplary UV chamber 142 that may be used with filtration assembly 130 (shown in FIG. 4). UV chamber 142 includes a generally tubular body 300 and is configured to receive water through one of a first end 302 and a second end 304, channel the water through tubular body 300, and channel the water out of UV chamber 142 through the other of first end 302 and second end 304. UV chamber 142 also includes a UV lamp 157 positioned adjacent the water flowing through UV chamber 142 and configured to irradiate the water with UV light to facilitate sterilizing organic material suspended within the water.

More specifically, in the exemplary embodiment, tubular body 300 circumscribes UV lamp 157, such that UV light emitted from UV lamp 157 in substantially all directions irradiates the water flowing along an annular path around UV lamp 157 through UV chamber 142, thus increasing an efficiency of UV chamber 142. For example, UV lamp 157 is located within a substantially translucent UV lamp tube 306 that extends coaxially with, and is circumscribed by, tubular body 300, such that UV lamp 157 is physically isolated from the water flowing through UV chamber 142. In alternative embodiments, UV lamp 157 is positioned with respect to UV chamber 142 in any suitable manner that enables portable liquid filtration device 100 to function as described herein.

Further in the exemplary embodiment, UV chamber 142 includes a UV chamber top cap 308 removably coupled to first end 302 such that UV lamp 157 and UV lamp tube 306 may be withdrawn from UV chamber 142 by uncoupling UV chamber top cap 308 from UV chamber tubular body 300. Additionally, UV chamber 142 includes a UV tube cap 310 removably coupled to UV chamber top cap 308 such that UV lamp 157 may be withdrawn from UV lamp tube 306 by uncoupling UV tube cap 310 from UV chamber top cap 308. A silicon O-ring 312 is positioned between UV chamber top cap 308 and UV tube cap 310 to facilitate stabilizing UV lamp tube 306 within UV chamber 142. In alternative embodiments, UV lamp 157 and/or UV lamp tube 306 are coupled to UV chamber 142 in any suitable fashion using any suitable components that enable portable liquid filtration device 100 to function as described herein. As shown in FIG. 3, in the exemplary embodiment, pair of UV chambers 142 is oriented such that water is channeled serially into second end 304 of a first of UV chambers 142, out of first end 302 of the first of UV chambers 142, into first end 302 of a second of UV chambers 142, and out of second end 304 of the second of UV chambers 142. This orientation facilitates placement of caps 308 and 310 of both UV chambers 142 adjacent to each other while reducing a flow path length between the two, such that UV lamp 157 of both UV chambers 142 may be replaced from the same end of filtration assembly 130. In alternative embodiments, UV chambers 142 are oriented in any suitable fashion that enables portable liquid filtration device 100 to function as described herein.

In some embodiments, each UV chamber 142 has a length of less than 24 inches. In alternative embodiments, each UV chamber 142 has any suitable length that enables portable liquid filtration device 100 to function as described herein.

In certain embodiments, at least one oxidation chamber 140 (shown in FIG. 5) further includes a separate UV lamp 157 positioned adjacent the water flowing through oxidation chamber 140, for example coupled to oxidation chamber 140 as described above with respect to UV chamber 142, or in any other suitable fashion. In some such embodiments, sanitization of the received water is further improved by the additional UV treatment occurring simultaneously with the ozone mixing in at least one oxidation chamber 140. In other embodiments, oxidation chamber 140 does include a UV lamp 157 positioned adjacent oxidation chamber 140.

Figure 7:
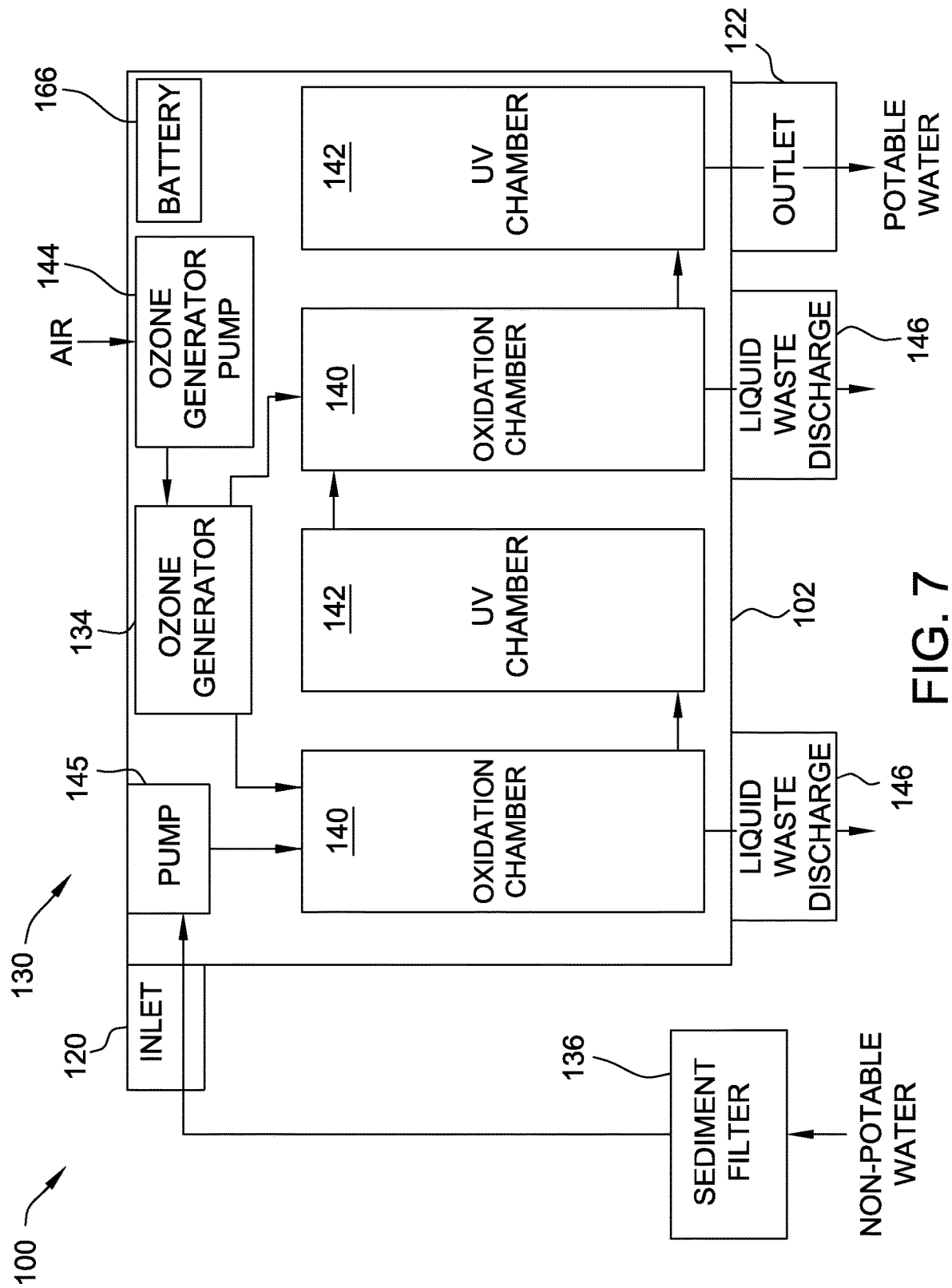
FIG. 7 is a block diagram of another alternative embodiment of the portable liquid filtration device shown in FIG. 1.

FIG. 7 is a block diagram of an alternative embodiment of portable liquid filtration device 100 (shown in FIG. 1) illustrating an alternative filtration assembly 130. The embodiment shown in FIG. 7 is substantially identical to the embodiment shown in FIG. 1, except filtration assembly 130 includes an additional oxidation chamber 140 as part of filtration duct 132. In addition, the embodiment of FIG. 7 illustrates internal battery 166 for providing power for operation of portable liquid filtration device 100, as well as the at least one liquid waste discharge port 146. Although internal battery 166 is illustrated as included within portable housing 102, in alternative embodiments, portable liquid filtration device 100 is coupled to external battery 128 located outside and separate from portable liquid filtration device 100.

More specifically, in the exemplary embodiment, filtration duct 132 includes a pair of oxidation chambers 140 and a pair of UV chambers 142 coupled together in serial flow communication. Ozone chamber 134 is configured channel a first portion of the generated ozone gas to a first of oxidation chambers 140 and a second portion of the generated ozone gas to a second of oxidation chambers 140 via parallel flow ozone delivery tubes 150. In alternative embodiments, portable liquid filtration device 100 includes any suitable number of oxidation chambers 140 and UV chambers 142 that enables portable liquid filtration device 100 to function as described herein.

In the exemplary embodiment, water received through inlet 120 is channeled into the first of oxidation chambers 140, flows through the first of oxidation chambers 140, and is channeled to a first of UV chambers 142. The first of UV chambers 142 is in downstream flow communication with the first of oxidation chambers 140 and receives the water from oxidation chamber outlet 122. Water flows through the first of UV chambers 142, is irradiated by UV lamp 157, and is channeled out of the first of UV chambers 142. The water is then channeled into a second of oxidation chambers 140, flows through the second of oxidation chambers 140, and is channeled into a second of UV chambers 142. Water received by the second of UV chambers 142 flows through the second of UV chambers 142, is irradiated by UV lamp 157, exits the second of UV chambers 142. After the water exits the second of UV chambers 142 the water is discharged through outlet 122 as potable water. In alternative embodiments, portable liquid filtration device 100 includes any suitable arrangement of the components of filtration assembly 130 that enables portable liquid filtration device 100 to function as described herein.

As described above, in some embodiments, waste is generated as the water flows through filtration duct 132, and discharged from at least one liquid waste discharge port 146. In the exemplary embodiment, a first portion of the waste is generated as the water flows through the first of oxidation chambers 140. The first portion of waste is separated from the primary flow through filtration duct 132, such as by a relatively heavier weight and/or a higher momentum of the waste as the flow turns at the chamber outlet, and is channeled to a first liquid waste discharge port 146 on portable housing 102 for discharge from portable liquid filtration device 100. Similarly, a second portion of waste is generated as the water flows through the second of oxidation chambers 140, separated from the primary flow through filtration duct 132, and channeled to a second liquid waste discharge port 146 on portable housing 102 for discharge from portable liquid filtration device 100. In alternative embodiments, waste generated as the water flows through filtration duct 132 is separated and discharged from portable liquid filtration device 100 in any suitable fashion that enables portable liquid filtration device 100 to function as described herein. In other alternative embodiments, waste is not generated in sufficient amounts to merit discharge from filtration duct 132.

In some embodiments, as described above, portable liquid filtration device 100 receives power from external battery 128 and/or internal battery 166. In some such embodiments, operating power requirements of portable liquid filtration device 100 are such that external battery 128 and/or internal battery 166, implemented as a 12-volt, 300 ampere-hour battery, is sufficient to operate portable liquid filtration device 100 for at least ten hours and/or to produce at least 2,000 total liters of potable water, before external and/or internal battery 166 requires a recharge or replacement. In alternative embodiments, external battery 128 and/or internal battery 166 operates portable liquid filtration device 100 to produce any suitable amount of potable water over a single charge of internal battery 166.

Figure 8:
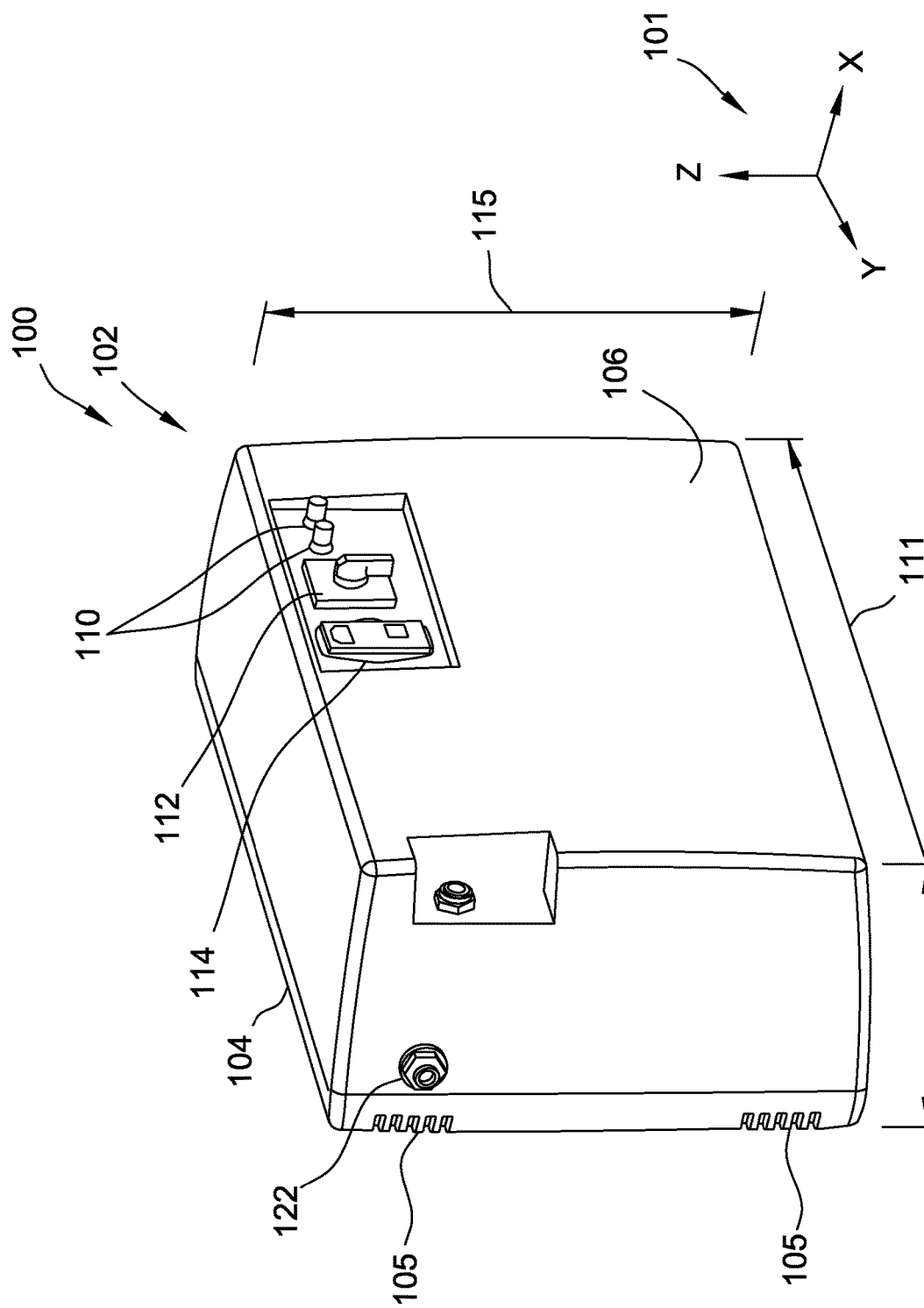
FIG. 8 is a perspective view of an alternative embodiment of the portable liquid filtration device shown in FIG. 1.
Figure 9:
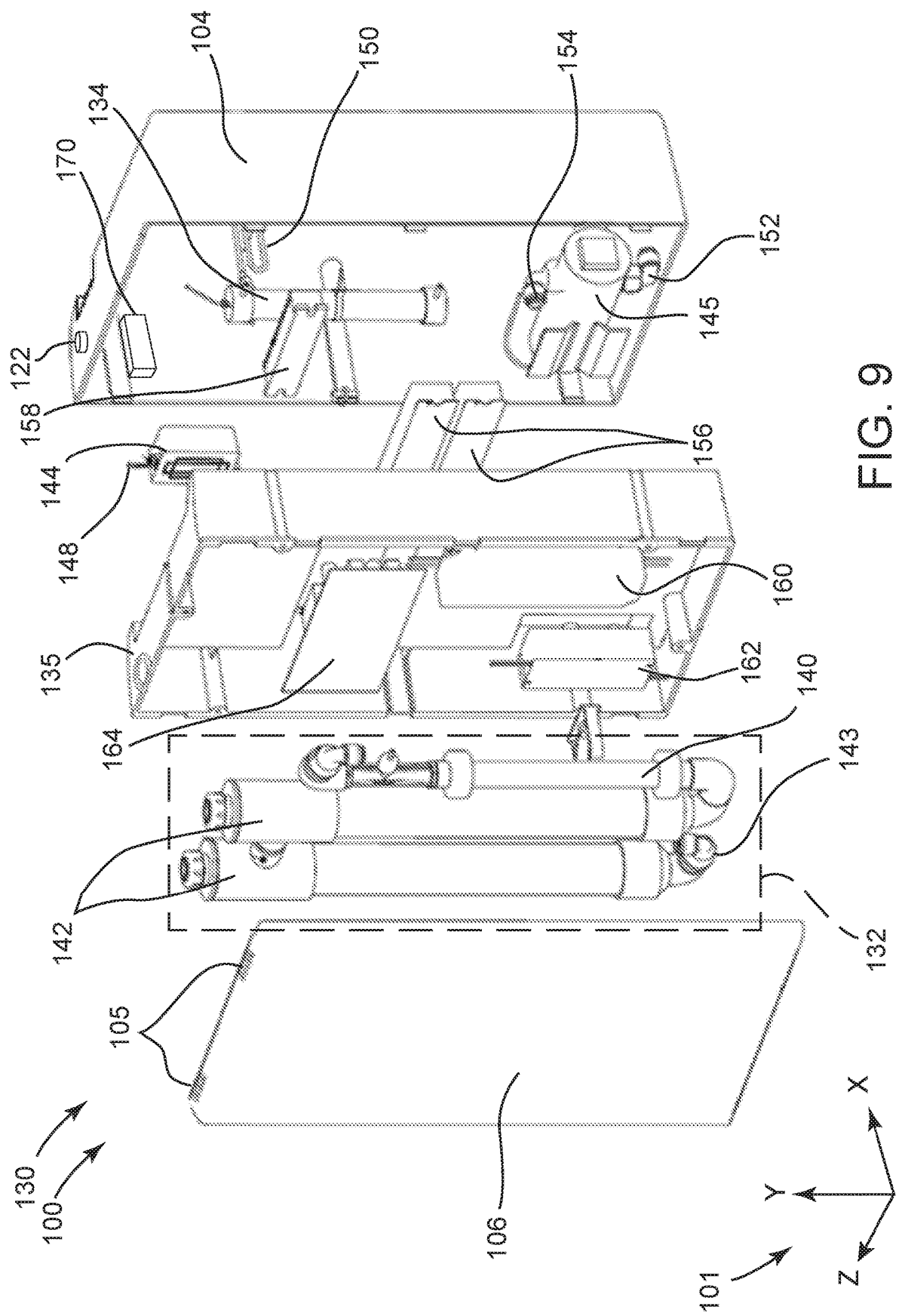
FIG. 9 is an exploded view of the alternative embodiment shown in FIG. 8 of the portable liquid filtration device shown in FIG. 1.

FIG. 8 is a perspective view of an alternative embodiment of portable liquid filtration device 100 (shown in FIG. 1) illustrating a horizontal arrangement of portable housing 102. FIG. 9 is an exploded view of the alternative embodiment (shown in FIG. 8) of portable liquid filtration device 100 (shown in FIG. 1). The embodiment shown in FIGS. 8 and 9 is substantially identical to the embodiment shown in FIG. 1, except portable housing 102 is oriented such that first dimension 111, which is greater than second dimension 113 and third dimension 115, extends parallel to a surface upon which portable housing 102 rests during operation of filtration duct 132. More specifically, in some embodiments, first dimension 111 extends generally horizontally. Thus, flow through oxidation chambers 140 and UV chambers 142, which is aligned with first dimension 111, is also substantially horizontal, which tends to reduce dynamic effects of the flow on portable housing 102. Configuring portable liquid filtration device 100 in a primarily horizontal layout facilitates decreasing the overall height of portable housing 102 with respect to the vertical, Z-direction and facilitates a stability of portable liquid filtration device 100 in certain operational environments. For example, configuring portable liquid filtration device 100 such that first dimension 111 extends along the horizontal X-direction facilitates lowering and stabilizing portable liquid filtration device's 100 center of gravity such that portable liquid filtration device 100 is less likely to tip over during operation of portable liquid filtration device 100, In alternative embodiments, portable housing 102 and filtration assembly 130 may be arranged in any manner that facilitates operation of portable liquid filtration device 100 as described herein.

Figure 10:
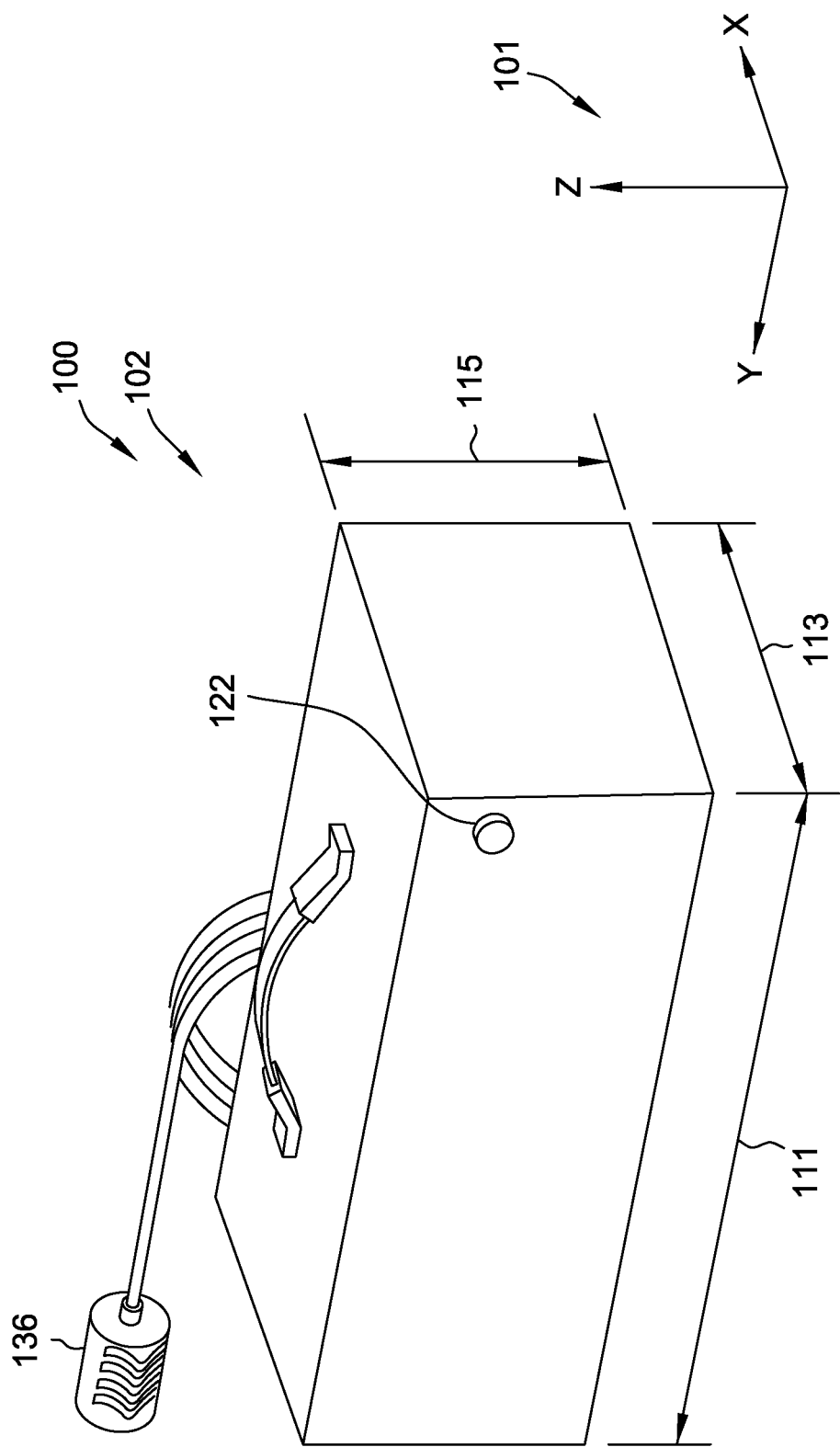
FIG. 10 is a perspective view of an alternative embodiment of the portable liquid filtration device shown in FIG. 1.
Figure 11:
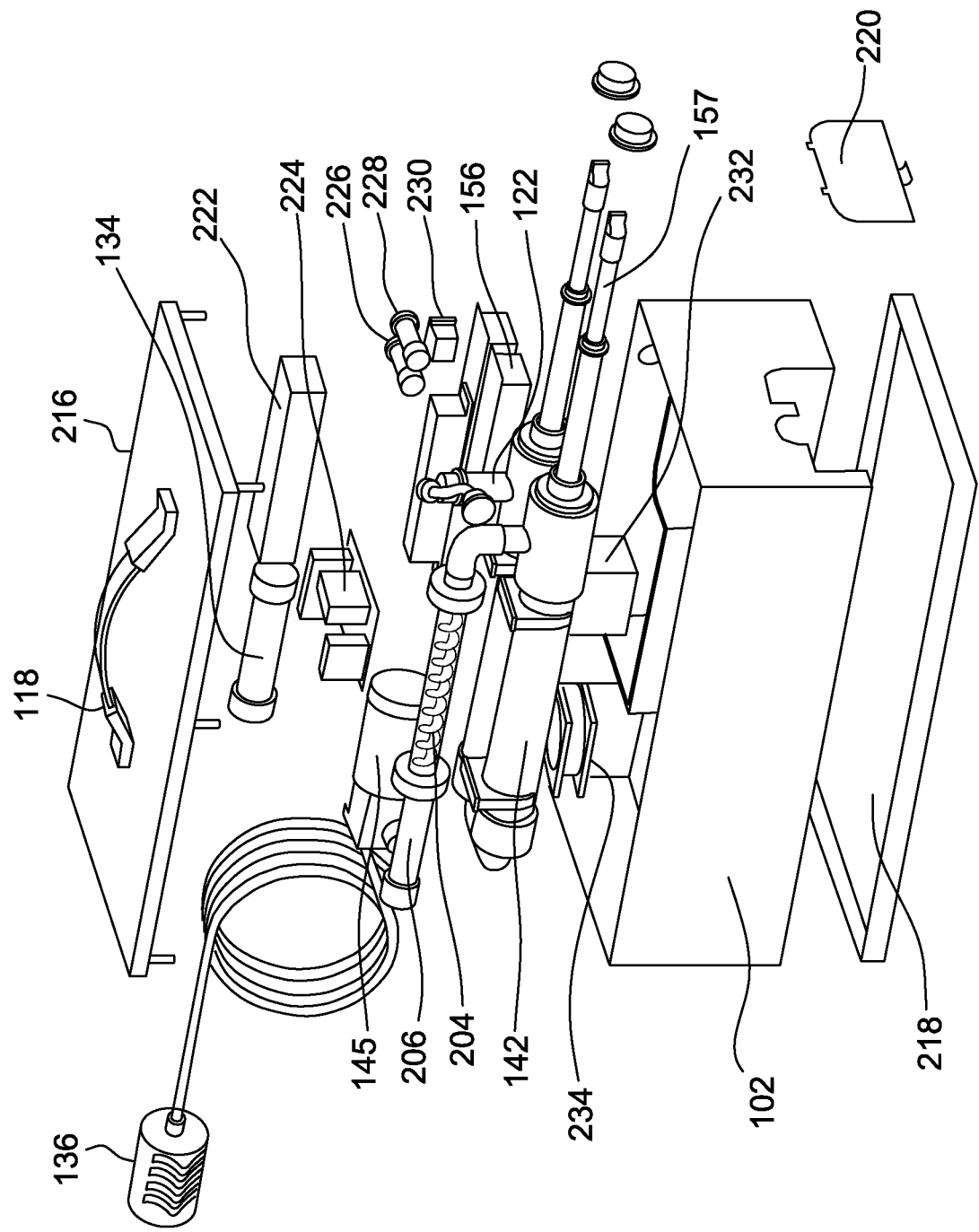
FIG. 11 is an exploded view of the alternative embodiment shown in FIG. 10 of the portable liquid filtration device shown in FIG. 1.

FIG. 10 is a perspective view of an alternative embodiment of portable liquid filtration device 100 (shown in FIG. 1) illustrating a horizontal arrangement of portable housing 102. FIG. 11 is an exploded view of the alternative embodiment (shown in FIG. 10) of portable liquid filtration device 100 (shown in FIG. 1). Device 100 includes a top cover 216, a bottom cover 218, and a side cover 220 that are selectively coupled to housing 102. Device 100 also includes a pump inverter 222, an ADC adapter 224, a DC port 226, an AC port 228, and an ADC switch 230. Device 100 also includes an ozone generator inverter 232 and a fan 234.

With reference to FIGS. 1-9, in certain embodiments, portable liquid filtration device 100 weighs less than 50 pounds, is sized to be received within a volume measuring no more than four cubic feet, and is operable to output at least 150 liters per hour of the received water from outlet 122 as potable water. In some such embodiments, portable liquid filtration device 100 is sized to be received within a volume measuring no more than two cubic feet, further facilitating the transportation of portable liquid filtration device 100 to supply potable water to areas of need. Additionally or alternatively, in some such embodiments, portable liquid filtration device 100 is operable to output at least 150 liters per hour of the received water from outlet 122 as potable water.

Moreover, portable liquid filtration device 100 is of robust construction and operable over a long lifetime. In some embodiments, portable liquid filtration device 100 is operable to produce at least 500,000 total liters of potable water before requiring repair or replacement of any component (other than external battery 128 and/or internal battery 166, if not recharged). Moreover, in some such embodiments, portable liquid filtration device 100 is operable to produce at least to produce between about 800,000 liters and about 1,000,000 million total liters of potable water before requiring repair or replacement of any component (other than external battery 128 and/or internal battery 166, if not recharged). In particular, in some such embodiments, portable liquid filtration device 100 is operable to produce about 1,600,000 total liters of potable water before requiring repair or replacement of any component (other than external battery 128 and/or internal battery 166, if not recharged). In alternative embodiments, portable liquid filtration device 100 is operable to produce any suitable amount of potable water before requiring repair or replacement of any component (other than internal battery 166, if not recharged).

Thus, portable liquid filtration device 100 has a limited weight and bulk that facilitates transportation of portable liquid filtration device 100 to areas of need, such as by manual transport by a user or small group of users over unimproved terrain if necessary, and also provides a high-volume output that reduces a number of water filtration units needed to meet emergency potable water requirements for a large number of people and/or over a long time period. Moreover, portable liquid filtration device 100 requires no additional assembly or set-up upon arrival at the site of need, but rather is ready to immediately generate potable water. Moreover, operation using replaceable and/or rechargeable external battery 128 (shown in FIG. 1) and/or internal battery 166 (shown in FIG. 7), located within portable housing 102 or separately provided, further facilitates use in areas where a power grid is offline or non-existent. In alternative embodiments, portable liquid filtration device 100 has any suitable weight and volume that enables portable liquid filtration device 100 to function as described herein.

The above-described embodiments of portable liquid filtration devices overcome at least some disadvantages of known water purification systems. Specifically, embodiments of the portable liquid filtration device include a portable housing, an inlet and an outlet, an ozone chamber, and a filtration duct including at least oxidation chamber and at least one UV chamber that cooperate together to sanitize the received water at an output of 400 liters per hour or more. Also specifically, in some embodiments, the device weighs no more than 50 pounds and/or occupies no more than four cubic feet, or even no more than two cubic feet. Also specifically, the device does not require internal filters that have to be replaced on a routine basis and/or that limit the flow rate of water through the portable liquid filtration device. Also specifically, in at least some embodiments, the portable liquid filtration device may be powered by a replaceable or rechargeable battery while producing 2,000 liters of potable water on a single battery charge.

Exemplary embodiments of a portable liquid filtration device, and methods of assembling the same, are described above in detail. The systems and methods are not limited to the specific embodiments described herein, but rather, components of systems and/or steps of methods may be utilized independently and separately from other components and/or steps described herein. For example, the system may also be used in combination with other water purification systems and methods, and is not limited to practice with only a portable liquid filtration device as described herein. Rather, the embodiments can be implemented and utilized in connection with many other liquid purification applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable liquid filtration device comprising:
    a portable housing having a first dimension, a second dimension, and a third dimension, the three dimensions orthogonal to each other, wherein the first dimension is greater than the second and the third dimensions;
    an inlet positioned on said portable housing and oriented to receive non-potable water therethrough;
    an ozone chamber defined within said portable housing, said ozone chamber oriented to receive air from external of said portable housing and to generate an ozone gas from the received air;
    a filtration duct within said portable housing and in downstream flow communication with said inlet, said filtration duct comprising:
        at least one oxidation chamber configured to mix the received water with the ozone gas from said ozone chamber, wherein said at least one oxidation chamber comprises a first outlet and a second outlet, said first outlet oriented to discharge a primary stream having a first density therethrough, and said second outlet oriented to discharge a waste stream having a second density therethrough, wherein the second density is greater than the first density;
        at least one ultraviolet (UV) chamber oriented to receive the primary stream from said at least one oxidation chamber, said at least one UV chamber comprising a UV lamp adjacent to the water within said filtration duct, said UV lamp configured to irradiate the water with UV light; and
    a liquid waste discharge on said portable housing and in downstream fluid communication with said second outlet to discharge the waste stream from said portable housing; and
    an outlet on said portable housing and in downstream flow communication with said filtration duct, wherein said filtration duct is operable to output at least 150 liters per hour of the received water from said outlet as potable water.

2. The portable liquid filtration device according to claim 1, wherein flow through said at least one oxidation chamber and said at least one UV chamber is aligned with the first dimension.

3. The portable liquid filtration device according to claim 1, wherein said portable housing weighs no more than 50 pounds and is sized to be received within a volume measuring no more than four cubic feet.

4. The portable liquid filtration device according to claim 1, wherein said portable housing further comprises a plurality of wheels and a handle, said plurality of wheels and said handle facilitate a user carrying and transporting said portable liquid filtration device.

5. The portable liquid filtration device according to claim 1, wherein said at least one oxidation chamber further comprises:
a Venturi nozzle configured to increase a flow speed of the received water such that absorption of the ozone gas by the received water is increased; and
a mixing vane within said at least one oxidation chamber, said mixing vane having a helical spiral shape.

6. The portable liquid filtration device according to claim 1, wherein said at least one UV chamber further comprises at least one O-ring between said UV lamp and said at least one UV chamber, said at least one O-ring facilitates structurally stabilizing said UV lamp within said at least one UV chamber.

7. The portable liquid filtration device according to claim 1, wherein said portable liquid filtration device further comprises at least one indicator light configured to visually indicate an operational status of said UV lamp of said at least one UV chamber, wherein the operational status is at least one of operable, other than optimally operable, and inoperable.

8. The portable liquid filtration device according to claim 1, wherein said at least one oxidation chamber comprises exactly two oxidation chambers and said at least one UV chamber comprises exactly two UV chambers, and wherein:
a first of said oxidation chambers is configured to mix the received water with a first portion of the ozone gas from said ozone chamber,
a first of said UV chambers is in downstream flow communication with said first oxidation chamber,
a second of said oxidation chambers is in downstream flow communication with said first UV chamber, said second oxidation chamber configured to mix the received water with a second portion of the ozone gas from said ozone chamber, and
a second of said UV chambers is in downstream flow communication with said second oxidation chamber.

9. The portable liquid filtration device according to claim 1, wherein said portable liquid filtration device is operable to output at least 2,000 liters of the received water from said outlet as potable water during a single charge of a 12 volt, 300 ampere-hour battery coupled to the portable liquid filtration device.

10. The portable liquid filtration device according to claim 1, wherein said filtration duct is configured to operate while said first dimension of said portable housing is oriented parallel to a surface upon which said portable housing rests.

11. A method of filtering non-potable water to produce potable water with a portable liquid filtration device, said method comprising:
receiving non-potable water at an inlet on a portable housing having a first dimension, a second dimension, and a third dimension, the three dimensions orthogonal to each other, wherein the first dimension is greater than the second and the third dimensions;
receiving air from external of the portable housing within an ozone chamber within the portable housing, the ozone chamber configured to generate an ozone gas using the received air;
channeling the non-potable water through a filtration duct within the portable housing, the filtration duct in downstream flow communication with the inlet;
mixing the received water with ozone gas from the ozone chamber within at least one oxidation chamber, wherein the at least one oxidation chamber includes a first outlet and a second outlet;
discharging a primary stream having a first density from the first outlet;
discharging a waste stream having a second density from the second outlet, wherein the second density is greater than the first density;
channeling the primary stream towards at least one ultraviolet (UV) chamber having a UV lamp adjacent to the water within the filtration duct, the UV lamp configured to irradiate the water with UV light;
discharging the waste stream from a liquid waste discharge on the portable housing, the liquid waste discharge in downstream fluid communication with the second outlet; and
outputting at least 150 liters per hour of the received water as potable water from an outlet in downstream flow communication with the filtration duct.

12. The method according to claim 11 further comprising orienting the at least one oxidation chamber and the at least one UV chamber such that the flow therethrough is aligned with the first dimension.

13. The method according to claim 11, wherein receiving non-potable water comprises receiving the non-potable water within the portable housing sized to be within a volume measuring no more than four cubic feet and wherein the portable liquid filtration device weighs no more than 50 pounds.

14. The method according to claim 11, wherein receiving non-potable water comprises receiving the non-potable water within the portable housing including a plurality of wheels and a handle, wherein the plurality of wheels and the handle are configured to facilitate transporting the portable liquid filtration device.

15. The method according to claim 11 further comprising:
increasing a flow speed of the received water, with a Venturi nozzle of the at least one oxidation chamber, such that absorption of the ozone gas by the received water is increased; and
mixing the received water with the ozone gas within the at least one oxidation chamber with a mixing vane positioned within the at least one oxidation chamber, the mixing vane having a helical spiral shape.

16. The method according to claim 11 further comprising stabilizing the UV lamp within the at least one UV chamber with at least one O-ring positioned between the UV lamp and the at least one UV chamber.

17. The method according to claim 11 further comprising indicating, with at least one indicator light, an operational status of the UV lamp of the at least one UV chamber, wherein the operational status of the at least one indicator light is at least one of operable, other than optimally operable, and inoperable.

18. The method according to claim 11, wherein the at least one oxidation chamber comprises exactly two oxidation chambers and the at least one UV chamber comprises exactly two UV chambers, and wherein said method further comprising:
- mixing, with a first of the oxidation chambers, the received water with a first portion of the ozone gas from the ozone chamber, wherein a first of the UV chambers is in downstream flow communication with the first oxidation chamber;
- mixing, with a second of the oxidation chambers, the received water with a second portion of the ozone gas from the ozone chamber, wherein a second of the oxidation chambers is in downstream flow communication with the first UV chamber; and
- receiving the mixture from the second oxidation chamber at a second of the UV chambers.

19. The method according to claim 11 further comprising outputting at least 2,000 liters of the received water from the outlet as potable water over a single charge of a 12 volt, 300 ampere-hour battery coupled to the portable liquid filtration device.

20. The method according to claim 11 further comprising producing about 1,600,000 total liters of potable water before requiring repair or replacement.

* * * * *